United States Patent
Cross et al.

(10) Patent No.: US 7,163,206 B2
(45) Date of Patent: Jan. 16, 2007

(54) FLUID SEAL

(75) Inventors: Rodney Alan Cross, Bath (GB); Paul Anthony Blanchard, Bath (GB)

(73) Assignee: Cross Manufacturing Company (1938) Limited, Bath (GB)

( * ) Notice: Subject to any disclaimer, the term of this patent is extended or adjusted under 35 U.S.C. 154(b) by 96 days.

(21) Appl. No.: 10/368,640

(22) Filed: Feb. 20, 2003

(65) Prior Publication Data

US 2004/0017045 A1  Jan. 29, 2004

Related U.S. Application Data

(60) Provisional application No. 60/399,129, filed on Jul. 30, 2002.

(30) Foreign Application Priority Data

Feb. 20, 2002 (GB) ................. 0203987.3
Jul. 30, 2002 (GB) ................. 0217539.6
Oct. 9, 2002 (GB) ................. 0223374.0

(51) Int. Cl.
*F16L 27/00* (2006.01)
*F16J 15/34* (2006.01)

(52) U.S. Cl. ............ 277/399; 277/395; 277/379; 277/385; 277/508; 277/530; 285/224

(58) Field of Classification Search ........ 277/377, 277/379, 385, 508, 509, 395, 530, 372, 373, 277/399; 285/224, 231
See application file for complete search history.

(56) References Cited

U.S. PATENT DOCUMENTS

| | | | |
|---|---|---|---|
| 927,462 A * | 7/1909 | Greenlaw | 285/267 |
| 2,279,969 A * | 4/1942 | Casperson | 285/14 |
| 2,514,495 A * | 7/1950 | Johnson | 89/37.16 |
| 2,980,341 A * | 4/1961 | Royer et al. | 239/261 |
| 3,198,557 A * | 8/1965 | Portouw | 285/224 |
| 3,355,889 A | 12/1967 | Taylor et al. | |
| 3,568,929 A | 3/1971 | Butter et al. | |
| 3,761,100 A * | 9/1973 | Taylor et al. | 277/373 |
| 3,806,136 A * | 4/1974 | Warner et al. | 277/373 |
| 4,311,313 A * | 1/1982 | Vedova et al. | 277/507 |
| 4,427,220 A * | 1/1984 | Decker | 285/263 |
| 4,549,753 A * | 10/1985 | Nuytten | 285/95 |
| 4,575,099 A * | 3/1986 | Nash | 277/345 |
| 4,593,917 A * | 6/1986 | Ferrari Aggradi et al. | 277/619 |
| 4,792,164 A * | 12/1988 | Suemitsu | 285/121.4 |
| 4,813,608 A | 3/1989 | Holowach et al. | |
| 4,893,847 A * | 1/1990 | Hess | 285/226 |
| 5,078,412 A | 1/1992 | Baumgarth | |
| 5,088,775 A | 2/1992 | Corsmeier et al. | |
| 5,158,305 A * | 10/1992 | Halling | 277/591 |
| 5,400,586 A | 3/1995 | Bagepalli et al. | |
| 5,425,585 A * | 6/1995 | Hoffmann et al. | 384/483 |
| 5,639,074 A * | 6/1997 | Greenhill et al. | 267/162 |
| 5,967,565 A * | 10/1999 | Kim | 285/49 |
| 6,109,663 A * | 8/2000 | Hayton | 285/272 |

(Continued)

FOREIGN PATENT DOCUMENTS

EP  0697514 A1 *  2/1996

(Continued)

*Primary Examiner*—Alison K. Pickard
(74) *Attorney, Agent, or Firm*—Young & Thompson

(57) ABSTRACT

A jet pipe assembly containing at least one joint provided with a seal assembly to isolate, substantially, the fluid flowing in the pipe from the fluid external to the pipe. The dynamic member of the seal assembly is provided with both radial and cylindrical sealing surfaces.

16 Claims, 7 Drawing Sheets

U.S. PATENT DOCUMENTS

| | | | |
|---|---|---|---|
| 6,418,727 B1 * | 7/2002 | Rice et al. | 60/799 |
| 6,443,459 B1 * | 9/2002 | Lebeau et al. | 277/372 |
| 6,709,023 B1 * | 3/2004 | French | 285/223 |
| 6,709,024 B1 * | 3/2004 | Swinford et al. | 285/233 |

FOREIGN PATENT DOCUMENTS

| | | |
|---|---|---|
| EP | 0 840 040 | 5/1998 |
| GB | 638283 | 6/1950 |
| GB | 862477 | 3/1961 |
| GB | 1227556 | 4/1971 |
| GB | 1 278 856 | 6/1972 |
| GB | 1437030 | 5/1976 |

* cited by examiner

FLUID SEAL

This patent application claims priority from U.S. provisional patent application Ser. No. 60/399,129 filed on Jul. 30 2002.

FIELD OF THE INVENTION

The field of the present invention is improvements relating to a fluid seal.

BACKGROUND TO THE INVENTION

The two function seal is required to seal the fluid flow path in gas turbine installations in situations where the jet thrust is required to be vectored such as, for example in vertical take off and landing aircraft. However similar technology may be applied to any installation where there is a fluid flow path, which may need to be vectored.

In the context of this specification the term fluid can refer to gases, vapours or substantially incompressible liquids.

The seals are required to isolate relatively large diameter fluid flow paths —typically covering the range 450 millimeters (18 inches) to 1830 millimeters (72 inches) and, in the case of gas turbine installations, are required to operate over wide and varying temperature ranges from ambient conditions both at sea level and at high altitude conditions rising to, typically, 400 degrees Celsius. The combination of large diameters and wide operating temperature ranges requires a seal which can accommodate significant movements in both the radial and axial directions. In particular, for aircraft vectored thrust jets, the axial movement that has to be covered by the radial faced seal has to be, typically, about one third of the installed width of the seal, for example, on a 1000 millimeter (39 inches) diameter seal the installed width is about 25 millimeters (1 inch) and the axial travel required on the dynamic sealing component is approximately 7 millimeters (0.276 inches). The severe environmental conditions with the relatively large diameters make conventional precision combined face and cylindrical seals unsuitable for this duty.

SUMMARY OF THE INVENTION

From one aspect the invention consists of a jet pipe assembly containing at least one joint provided with a seal assembly to isolate, substantially, the fluid flowing in the pipe from the fluid external to the pipe; the seal being characterised in that the dynamic member of the seal assembly is provided with both radial and cylindrical sealing surfaces.

The jet pipe assembly may contain at least one rotating joint to enable the jet to be orientated and the seal may be provided in a said rotating joint.

The seal dynamic member may be held in contact with a mating radial sealing surface of a seal back member by spring means. The spring means may consist of a number of cantilevered leaf springs spaced round the circumference of the seal, the free end of each leaf spring bearing against the seal dynamic member in a substantially tangential manner. Alternatively, the spring means may consist of an axial wave spring; in its free axial state the crest to crest distance between adjacent waves is larger than the assembled distance into which the wave spring is fitted when the seal assembly is fully extended in the axial direction.

Means may be provided to restrain the dynamic member within the static members when the seal assembly is separated from its normally installed position in the jet pipe.

The normally static member of the seal assembly can be free to slide on the bulkhead member of the jet pipe assembly so that the complete seal assembly is fully floating between the said bulkhead member and the radial mating surface of a seal back member.

The dynamic member may include a transverse flange, the transverse flange having a cut out portion into which part of the static member projects, thereby limiting relative rotational movement of the dynamic member and the static member.

The dynamic member may be substantially ring-shaped and the part of the static member that projects into the cut out portion includes at least one tag depending from a substantially ring-shaped member. Alternatively, the part of the static member that projects into the cut out portion includes at least one tag that depends from at least one respective portion arranged around the circumference of the dynamic member.

From a second aspect, the invention consists of a seal assembly including a static element, a dynamic element and a spring acting between the elements for urging the dynamic element against a sealing surface, wherein the elements have respective portions which slidingly engage for movement substantially along the line of action of the spring to provide a sliding seal between them.

The dynamic element may have a sealing portion extending generally orthogonally with respect to the line of action. In one embodiment, the spring is not in contact with the sealing portion of the dynamic element.

The static element and dynamic elements may be L-shaped and the legs of the L-shaped elements can provide the sliding seal.

The seal assembly may further include an annular cavity defining a precision groove with its open end facing along the line of action characterised in that the seal may be assembled to use either the concave or convex wall of the groove as the sealing surface in dependence on the direction of fluid pressure gradient across the seal.

The dynamic element can include a transverse flange and the seal assembly may further include an oppositely direct transverse flange for engaging the first mentioned transverse flange to limit the movement, in one direction, of the dynamic element along the line of action. The oppositely directed flange may be formed on a retaining ring.

In some embodiments, the dynamic member is substantially ring-shaped but includes a gap in its circumference to allow the seal assembly to expand and contract. The seal assembly may further include a plate attached to the ring adjacent the gap, the plate being arranged so that it substantially spans the gap during expansion of the seal assembly. The plate may be in the form of an angle section.

In some embodiments, the dynamic element and/or the retaining ring are generally U-shaped in section.

The components of the static and dynamic elements of the seal can be sized or shaped such that they will be frictionally retained against gravity in an assembled condition during mounting of the seal assembly.

Where a retaining ring is used, the ring itself may be retained by adhesive during assembly or mounting of the seal. The adhesive can be selected to lose its adhesive property at a temperature at or below the operating temperature range of the seal assembly.

From another aspect the invention consists of a jet pipe assembly substantially as defined above incorporating a seal substantially as defined above.

In the several embodiments of the seal covered in this specification, the dynamic component of the seal is in the form of an "L" or "U" section metal ring one side of which abuts up to a rotating flat radial annular surface. The annular inner diameter of the dynamic seal component is in close sliding contact with a cylindrical surface which normally forms part of the static assembly. The dynamic component may be held into contact with the rotating face by a spring member fitted between the static and dynamic parts of the seal assembly.

Two types of spring members are covered in the embodiments; one is a fabricated sub-assembly consisting of a round section wire ring to which are attached at regular pitches a number of cantilevered leaf springs the leaves being inclined to the main axis of the seal and curved to contact the dynamic component in an approximate tangential manner. The alternative design of spring member is in the form of an axial wave spring the axial distance between the alternate wave crests prior to assembly being longer than the fully extended sealing distance existing between the spring abutments so that in the extended installed condition there is an initial axial force holding the dynamic component of the seal against the rotating radial surface.

Also covered is the means by which the seal dynamic member is confined to a limited rotation on the cylindrical sealing surface under the action of the drag forces set up at the radial sealing surfaces.

From another aspect, the invention consists of an assembly provided with a seal assembly to isolate, substantially, fluid flowing in the assembly from the fluid external to the assembly; wherein the dynamic member of the seal includes a transverse flange, the transverse flange having a cut out portion into which part of the static member of the seal projects, thereby limiting relative rotational movement of dynamic member and the static member.

The dynamic member may be substantially ring-shaped and the part of the static member that projects into the cut out portion includes at least one tag depending from a substantially ring-shaped member. Alternatively, the part of the static member that projects into the cut out portion includes at least one tag that depends from at least one respective portion arranged around the circumference of the dynamic member.

BRIEF DESCRIPTION OF THE DRAWINGS

The improvements which are the subject of this invention will now be described by way of example with reference to specific embodiments which are shown in the accompanying drawings in which.

DETAILED DESCRIPTION OF THE DRAWINGS

Figure 1:
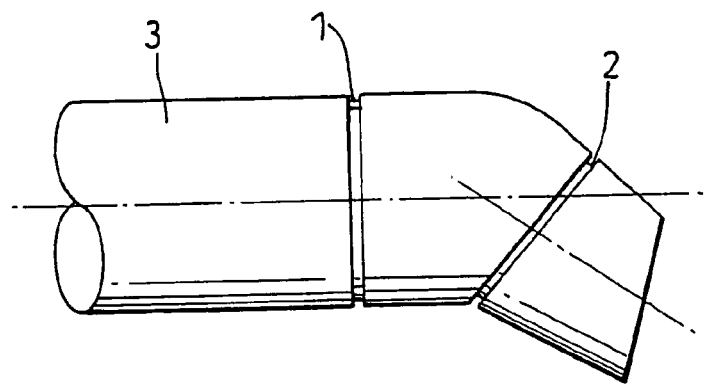
FIG. 1 is a simplified view of a vectored thrust jet pipe with the rotation axes indicated by chain dotted centre lines.

Referring to FIG. 1 the seal, the subject of this invention, can be incorporated into the swivel joints 1 & 2 of the jet pipe assembly 3. The jet pipes need not be of circular section provided that the profiles in the plane of the joints remains circular as illustrated.

Figure 2:
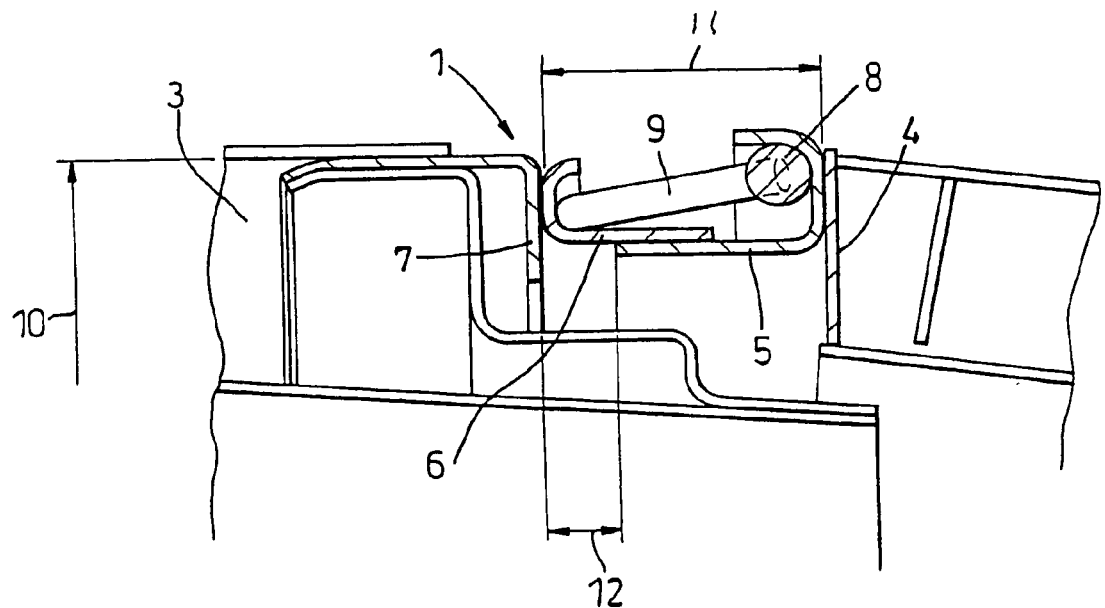
FIG. 2 is a typical radial section of the seal components with the surrounding jet pipe details added.

FIG. 2 shows a typical section on an axial plane of the seal assembly 1, the individual seal components being cross hatched in order to differentiate from the jet pipe components. The seal consists of an annular bulkhead 4, welded into the jet pipe and to which is attached the cylindrical guide member 5. In close sliding relationship with the guide member 5 is the dynamic component 6 of the seal. This has a section in the form of the letter J (but viewed horizontally) the radial surface being held against the seal back member 7. The relative circular rotation required to orientate the jet pipe occurs in the seal assembly between the radial plane surfaces of components 6 & 7 whilst the axial movement required to take up thermal expansion etc. occurs between the cylindrical surfaces of components 6 & 5.

In order to maintain a gas tight seal it is necessary to generate a force to hold the radial surfaces of components 6 & 7 in close contact. The force is generated by a series of flexing leaf springs 9. The free end of each leaf spring presses on the non-sealing radial side of the dynamic component 6 whilst the other end of the leaf spring is welded or otherwise attached to a solid metal ring 8 taking the reaction forces, generated by the distortion of each leaf spring, back to the cylindrical guide member 5 and thence to the seal bulkhead 4. In the particular example illustrated in FIG. 2 the seal width 11 between bulkhead 4 and back member 7 will be about 25 millimeters (1 inch) when fully extended and is able to move axially by the distance 12 equal to approximately 7 millimeters (0.276 inches). These distances, typically, are associated with a seal diameter 10 of 1000 millimeters (39 inches).

Figure 3:
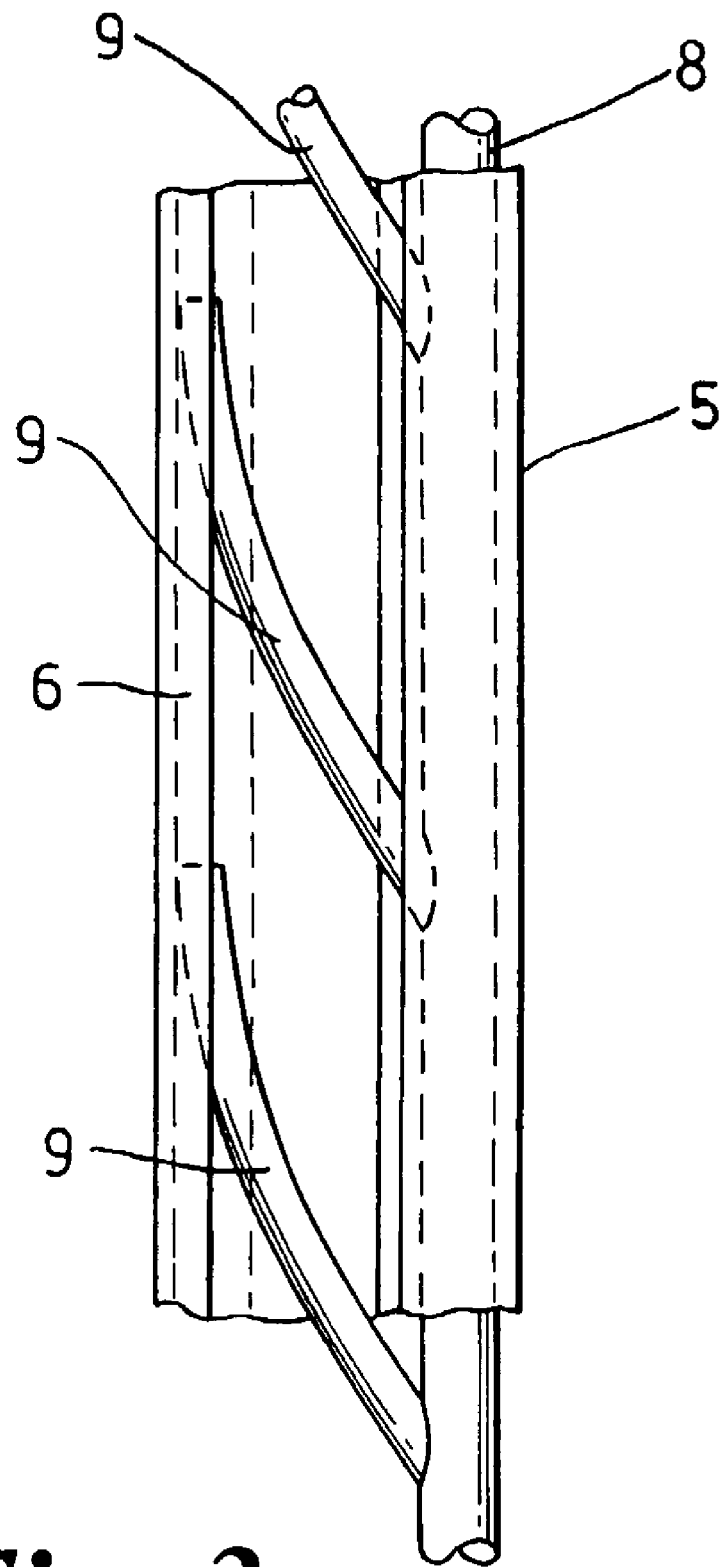
FIG. 3 is a localised view from the upper side of FIG. 2 showing a portion of one type of fabricated spring member.

FIG. 3 shows a short circumferential length of the ring 8 and leaf springs 9 located in the guide member 5 and dynamic component 6. The latter is in its fully extended position.

Figure 4:
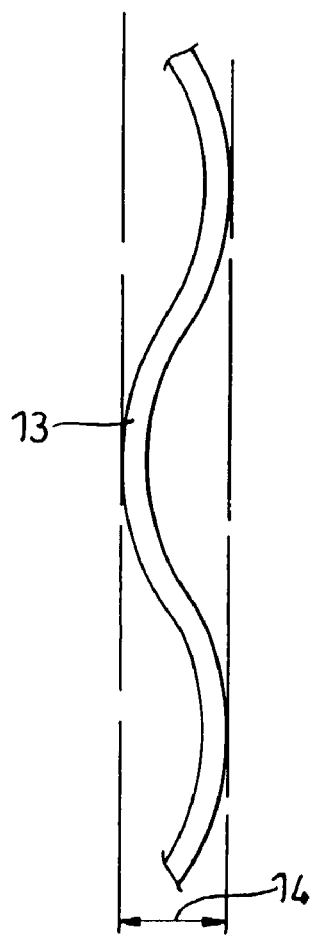
FIG. 4 shows a similar view to FIG. 3 of the alternative axial wave spring member.

FIG. 4 shows a portion of an alternative spring means in place of the ring and leaf springs 8 & 9. The complete spring means is in the form of an interrupted axial wave spring 13 of typically rectangular section with the corners of the rectangle rounded. The axial distance 14 between adjacent wave crests is longer than the maximum installed space provided for the wave spring in order to give some initial compression when the seal is in its fully extended installed state. The interruption of the complete circular form is necessary because the spring can be compressed to a substantially planar profile, so eliminating the "waves". However, in this compressed state and with a restraint on the ring outside diameter—the wire length must not exceed the circumference so in the "extended" seal position a modest gap in the circumference is permitted. With the wave spring compressed so that the wire is substantially in one plane the seal axial travel 12 will be substantially the same as exists with the spring arrangement as shown in FIGS. 2 & 3.

Figure 5:
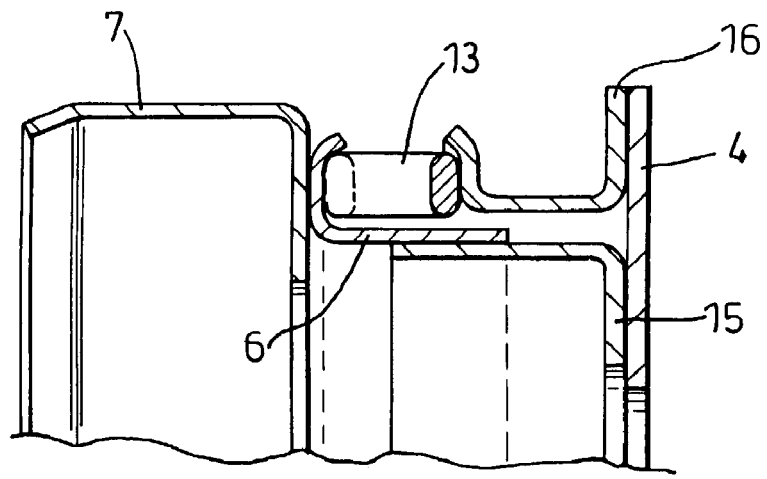
FIG. 5 shows a section through the components of a seal fitted with the axial wave spring member.

FIG. 5 shows one embodiment of the seal designed to accommodate the axial wave spring 13. An "L" section cylindrical guide member 15 replaces the previous component 5 and the "static" side of the wave spring is held in its axial position by an additional "U" section ring 16 attached to the bulkhead 4. As in previous figures the seal assembly is shown in its fully extended position.

Figure 6:
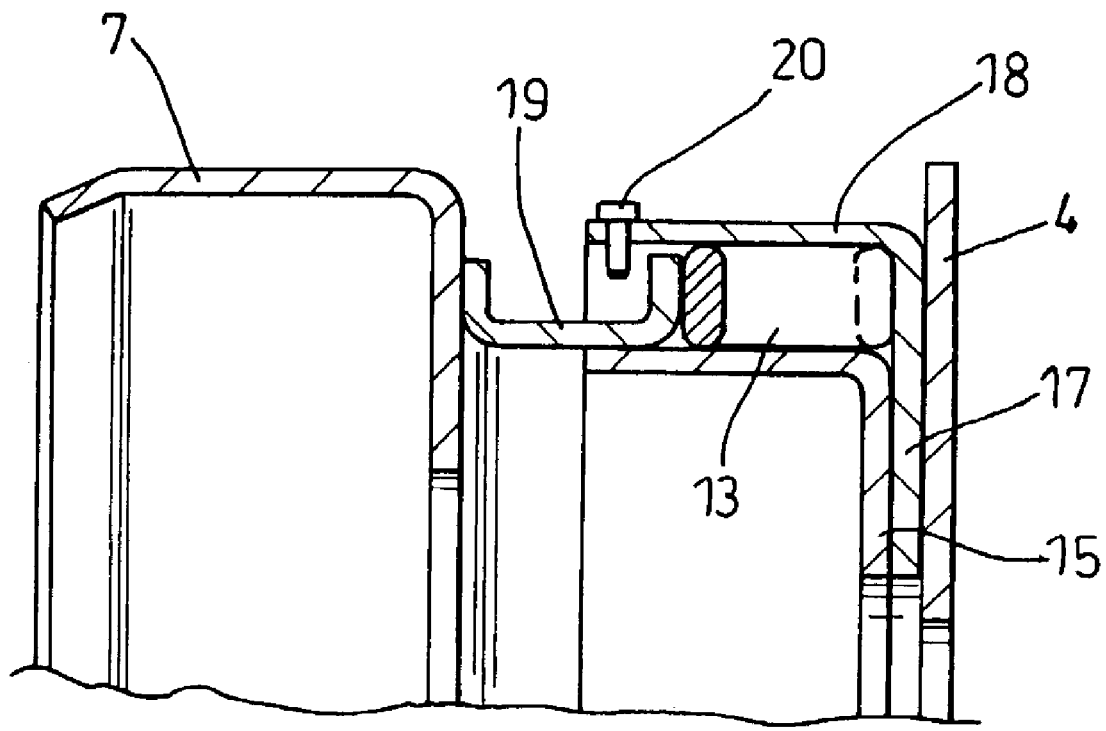
FIGS. 6, 7 & 8 show different embodiments of the seal design illustrated in FIG. 5.

FIG. 6 shows a further embodiment of the seal designed to be used with the axial wave spring. In this assembly an inverted "L" section spring retaining ring 17 is provided. This is fixed to the bulkhead 4 and the upper, as illustrated, part of the ring 18 passes over the top of the wave spring so that the latter is fully contained within an annular space. In order to save weight the continuous wall formed by the upper part 18 of the ring 17 can be replaced by individual guide fingers spaced equally round the seal circumference. The seal dynamic component 19 is now in the form of a "U" section ring as illustrated. The pins 20 are a further option which may be added to hold the dynamic component 19 and axial wave spring 13 within the seal guide members 15 & 18 when the jet pipe is in its unassembled state. The pin 20 could also be replaced by—"turned down on assembly finger extensions"—to achieve the same feature.

Figure 7:
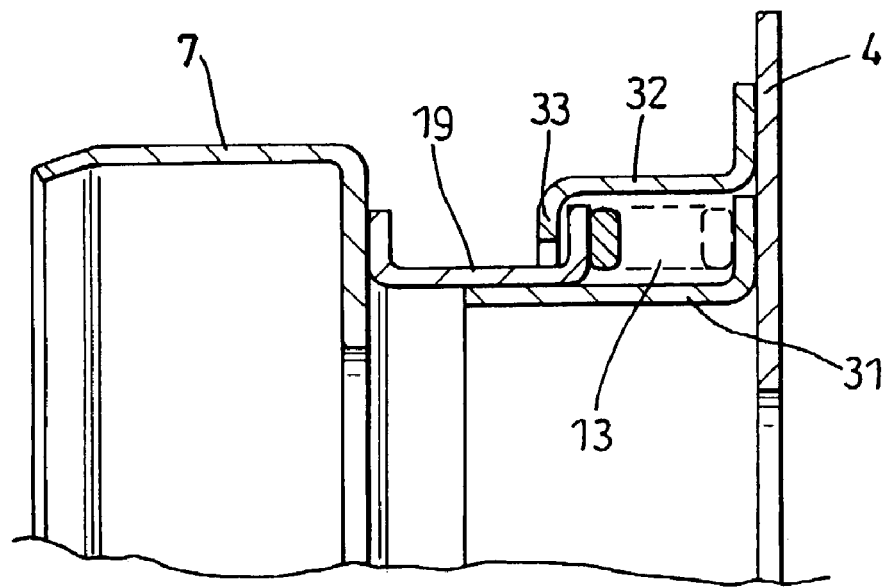

FIG. 7 shows a further embodiment using the same design of dynamic component 19 and axial wave spring 13 as illustrated in FIG. 6. The cylindrical guide member 31 is now in the form of an L-section ring welded or otherwise attached to the annular bulkhead 4. The spring and seal retaining ring 32 is similarly attached to the annular bulkhead 4. The ring 32 is provided with a turned down flange, or individual fingers 33, in order to hold the seal components together when the jet pipe is in its dismantled state.

Figure 11:
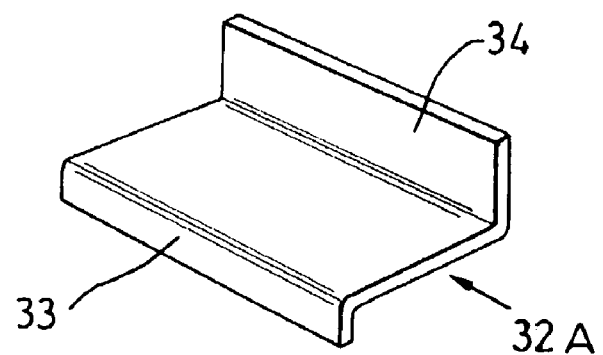
FIG. 11 shows a perspective view of a spring and seal retention tab; a number of such tabs may replace the spring and seal retention ring illustrated in FIG. 7.

One advantage of this embodiment is that in order to save weight and simplify manufacture, the spring and seal retaining ring can be replaced by a number of curved sections 32A having individual tabs 34; one such tab is shown in the perspective sketch of FIG. 11.

Another advantage is provided by the "U" section dynamic member 19.

The right hand vertical portion of this member in FIG. 7 is located between the finger 33 and the spring 13. Thus, the spring 13 is not directly in contact with the part of the dynamic member that forms the sealing path (i.e. the horizontal and left hand vertical portions in FIG. 7). Such a spring can cause a local pressure spot on the sealing flange and result in a slight distortion of the flange and higher leakage losses. Thus, even if distortion occurs in the seal shown in FIG. 7 it should normally happen to the portion of the dynamic member remote from the actual sealing path.

Figure 8:
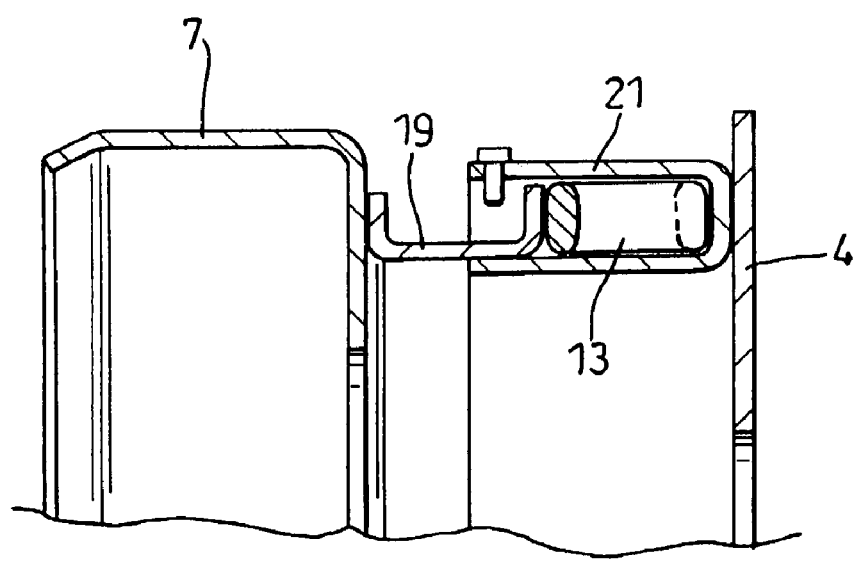

FIG. 8 is a further embodiment using the axial wave spring in a combined horizontal "U" section cylindrical guide member and spring retainer 21. A particular advantageous option with this assembly is that the seal components 13, 19 and 21 can, if required, form a sub-assembly which is fully floating between the bulkhead 4 and seal back member 7. This requires the inner surface of the bulkhead 4 to be a sliding surface in contact but not fixed to member 21. In a practical installation there will normally be a static restraint holding the seal assembly roughly concentric with the rotor turning centre. The embodiment of FIG. 8 allows further flexibility in the jet pipe assembly and can also mean that the seal components may be assembled together prior to fitting in the jet pipe.

Figure 9:
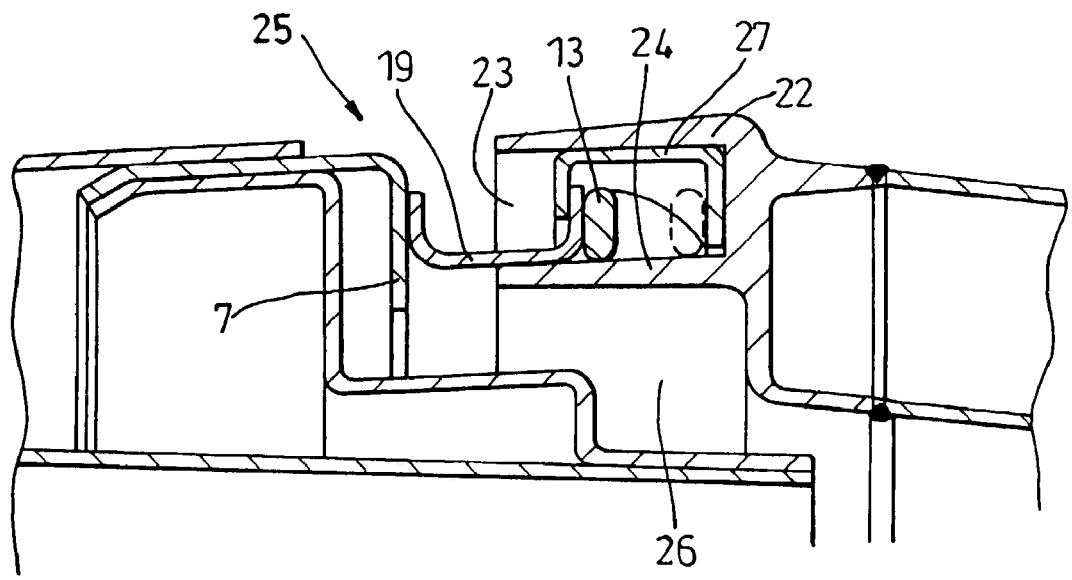
FIG. 9 shows a further development of the seal design illustrated in FIG. 6. In this embodiment the seal design has been made suitable for operating within a machined, or otherwise produced, precision annular groove.

In situations where it is not possible to obtain the required accuracy and the thermal stability with an all welded fabricated seal housing assembly, the annular bulkhead 4 may be replaced by a forged or cast ring member provided with a machined annular groove carrying the seal dynamic and static components. One embodiment of this design is shown in FIG. 9. The forged or cast ring member 22 is provided with a machined groove 23. The dynamic component 19 is in contact with the inner cylindrical surface 24 of the machined groove 23 forming a substantial leak tight fluid seal in the axial direction whilst one flank of the U-section dynamic component is held against the seal back member 7 by action of the wave spring member 13.

In this embodiment the fluid in the space 25 will be at a higher pressure than the fluid in the inner space 26, the pressure gradient assisting in holding the dynamic component 19 against the inner cylindrical surface 24.

In order to hold the seal components together as a separate assembly, so that the seal can be inserted into the groove with the wave spring member 13 already nearly compressed to its maximum operating length, the inverted U-section as drawn retaining ring 27 may be provided. Both this ring and the dynamic U-section ring 19 are rolled from folded strip and, therefore, require a single butt joint at one radial plane in the circumference. The circumferential length of the dynamic component 19 is such that the joint is in abutment when the ring is in contact with the inner cylindrical surface of the groove 23. This abutment may be opened out during assembly so that the two U-section ring components 19 and 27 can be "wound" one into the other with the adjacent channel flanks overlapping as illustrated.

As in previous diagrams, FIG. 9 illustrates the seal assembly fully extended in the axial direction. It will be appreciated that, in the finally installed state, there will be a small axial gap between the adjacent overlapping flanks of the dynamic component 19 and the retaining ring 27 so that the compressed wave spring member 13 can provide the initial contact force between the dynamic component 19 and the seal back member 7.

Figure 10:
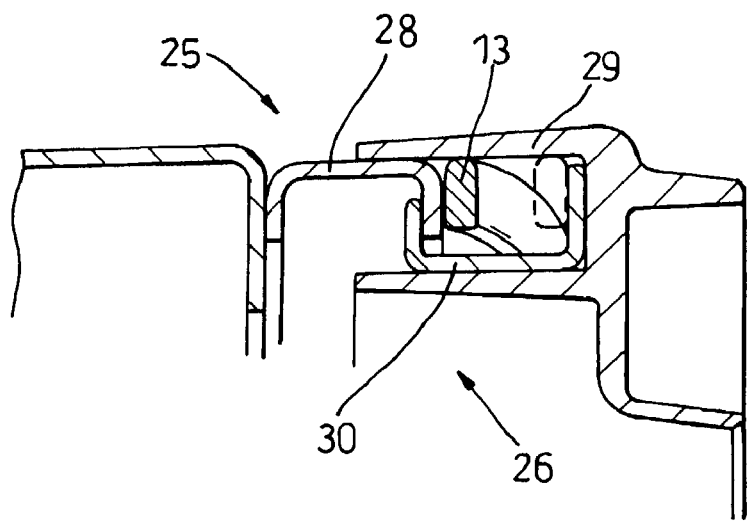
FIG. 10 shows a similar design to the seal illustrated in FIG. 9, but with the dynamic components reversed, in a radial sense, in order to provide a seal against a fluid pressure gradient that is radially opposite to the pressure gradient existing across the seal shown in FIG. 9.

FIG. 10 shows the design changes needed to the seal components if, in the working state, the pressure gradient across the seal is in the reverse direction from that illustrated in FIG. 8. The pressure in space 25 is now lower than the pressure in the inner space 26 so that the dynamic seal component 28 now has to provide an axial fluid seal against the outer cylindrical surface 29 of the machined groove.

Figure 12:
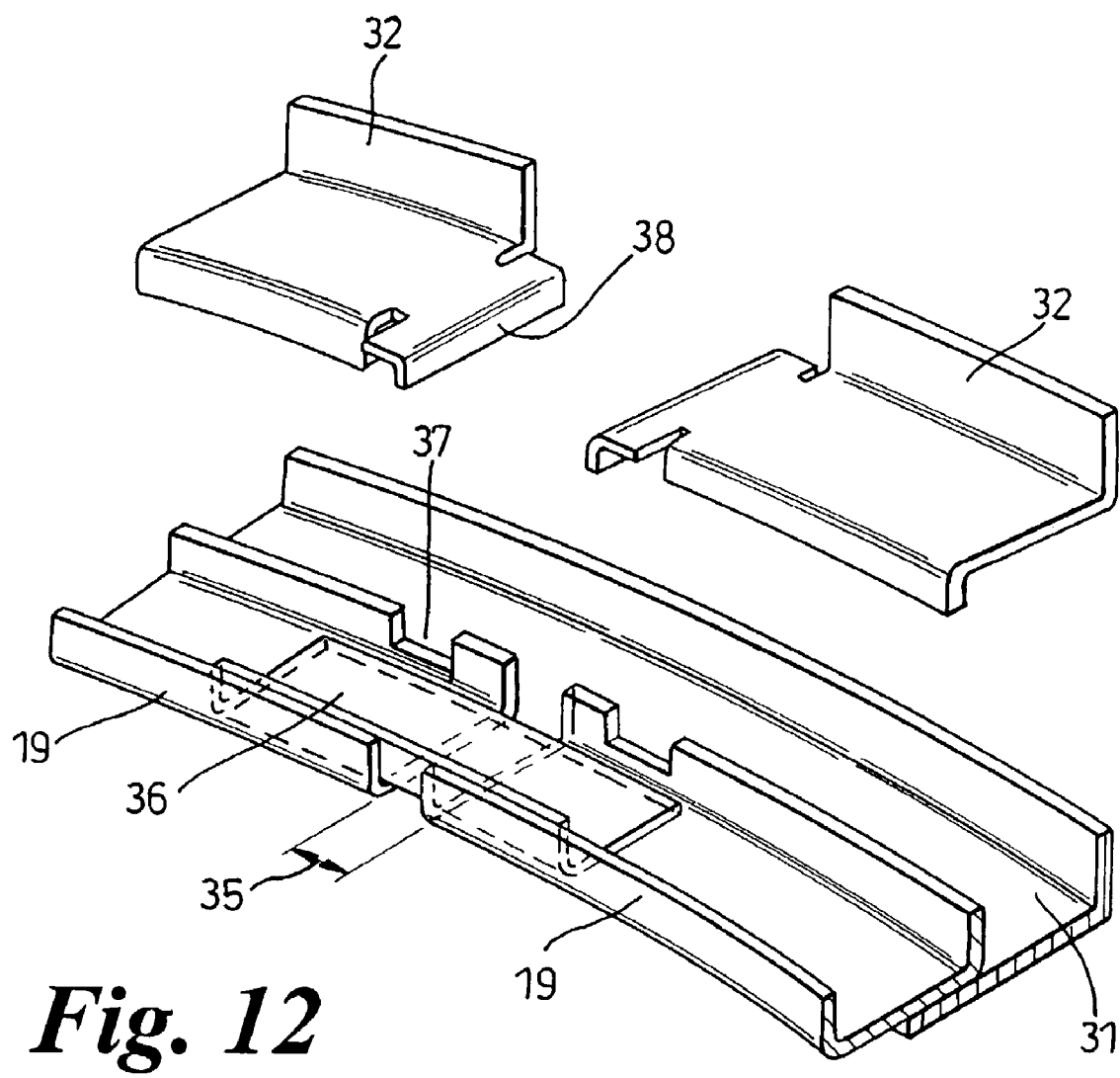
FIG. 12 shows a perspective view, partly exploded, of the portion of the seal assembly in the region of the dynamic seal member abutments and incorporating one embodiment of the feature which limits rotation of the seal dynamic member on the cylindrical sealing surface.

FIGS. 11 and 12 illustrate perspective views of some of the seal components that can be used as alternatives to the design shown in FIG. 7, with particular reference, in the case of FIG. 12, to the means of limiting the rotation of the seal dynamic component ring 19 on the cylindrical guide member 31. In FIG. 12 the ring is shown in the region of the section gap and in its correct position relative to the cylindrical guide member 31; but the ends of the overlaying spring and seal retainer ring 32 have been raised up vertically as drawn to reveal the rotational travel limit feature.

The two abutting ends of the ring 19 are shown separated by a short length 35. This gap allows the seal components to expand and contract under the influence of the varying working temperature conditions. In order to reduce the escape of gases through the gap 35, a gap plate 36, in the form of a short angle section, may be fitted into the base of the channel section. Thus, the part of the gap in the base of the ring as well as the part of the gap in the inner transverse flange of the ring can be covered by the plate 36. The plate is welded, or otherwise attached, to one end of the ring 19 only and spans the gap 35 and is free to slide circumferentially over the other end of the ring 19 as the gap width varies.

On at least one side of the ring gap and present on the non-sealing flange of the channel section ring 19 is a typically rectangular cut out 37. When assembled, the cut out co-operates with the turned down tag 38 formed in the gapped end of the spring and seal retainer ring 32. The circumferential width of the cut out 37 is sufficient to allow the rotational movement of the ring 19 to accommodate the varying width of the gap 35, but the presence of the tag 38 in the cut out 37 prevents the ring 19 being rotated over a significant angle relative to the cylindrical guide member 31 whilst a jet thrust vectoring operation is taking place.

In the event that the continuous spring and seal retainer ring 32 is replaced by curved portions 32A having individual tabs 34 as illustrated in FIG. 11 then at least one such tab will be provided with a turned down tag (similar to tag 38 of FIG. 12) in order to co-operate with the cut out 37. In the design as shown in FIG. 12 where each end of the ring 19 is provided with a cut out 37, a single tab may be provided with turned down tags 38 at each end, to co-operate with the corresponding cut outs at each end of the ring 19.

In certain assembly situations, particularly in large aircraft gas turbines, it is necessary to assemble the jet pipe seals with the turbine axis vertical. In the event that the static half of the seal is at the bottom end of the assembly, it is advantageous to provide means to hold the seal components within the machined groove against the force of gravity whilst the rest of the assembly containing the seal back member 7 is being offered up and bolted into position.

The required force opposing the gravitation force may be obtained by generating radial forces between the seal assembly components 13, 19 and 27 in FIG. 9 or components 13, 28 and 29 in FIG. 10, either singly or in combination, the sum of such forces multiplied by the friction coefficients between the respective sliding surfaces being greater than the force produced by gravitation acting on the mass of the seal assembly components when orientated into a vertical axis.

For temporary retention of the seal assembly components within the groove 23 an alternative to the generation of a controlled friction force is to apply a quick setting adhesive between the surface of the groove 23 and the retaining ring 27 in FIG. 9 or the retaining ring 30 in FIG. 10. The adhesion property of the adhesive may be destroyed by heat if required after completion of the main assembly of the jet pipe.

The embodiments of the seal described above have radial as well as axial movement capabilities. The axial movement allows the dynamic member of the seal to bridge a gap of up to 7 mm (0.276 inch) in an aircraft vectored thrust jet, whilst maintaining an overall extended length for the assembly of, typically 25 mm (1 inch). The seal is corrosion resistant and can function at high temperatures (e.g. up to 350° C.) in a jet pipe cooling system. Suitable materials for the seal include corrosion resisting Nickel or Cobalt based alloys. Conventional seals that use flexible polymer based components in order to obtain a limited amount of movement are normally restricted to use in situations where the temperature is below 200° C.

In this specification the terms "static" and "rotating" have been used to describe members of the seal assembly. It should be understood however that, particularly in the case of vectored thrust nozzles employing more than one circular motion in series, the terms static and rotating are relative to each other and, in absolute terms, any part of the seal can be either rotating or static relative to the vehicle or plant to which the jet pipe is attached.

We claim:

1. A jet pipe assembly comprising a seal assembly including first and second seal backing members adapted to be secured one to each of two jet pipes, one said backing member having a cylindrical sealing surface and the other said backing member having a radial sealing surface, said sealing surfaces being coaxial, an annular sealing member in sliding and sealing relation with both said sealing surfaces, and resilient means acting between said sealing member and said one backing member to urge said sealing member against said radial sealing surface,
wherein said sealing member is U-shaped in cross section with two legs and a central portion, one of said legs bearing on said radial sealing surface, said resilient means bearing on the other of said legs, and said central portions slidably contacting said cylindrical sealing surface.

2. A jet pipe assembly as claimed in claim 1, and means on said one backing member providing an annular housing for said resilient means, and means on said annular housing extending into said sealing member between said legs to retain said sealing member in assembly with said resilient means.

3. A jet pipe assembly as claimed in claim 1, wherein the resilient means consists of a wave spring with, in its free axial state, a crest-to-crest distance between adjacent waves of the spring being larger than an assembled distance into which the wave spring is fitted when the seal assembly is fully extended in an axial direction.

4. A jet pipe assembly as claimed in claim 3, wherein the other backing element has a sealing portion extending generally orthogonally with respect to the line of action.

5. A jet pipe assembly as claimed in claim 4, wherein the resilient means is not in contact with the sealing portion of the sealing member.

6. A jet pipe assembly as claimed in claim 3, wherein the other backing element is L-shaped in section.

7. A jet pipe assembly as claimed in claim 6, wherein at least one leg of the L-shaped in section element provides the sliding seal.

8. A jet pipe assembly as claimed in claim 1, wherein the seal assembly resilient means acts along line of action.

9. A jet pipe assembly as claimed in claim 1, wherein the jet pipe assembly contains at least one rotating joint to enable the jet to be orientated and the seal is provided in a said rotating joint.

10. An assembly as claimed in claim 1, in which means are provided to restrain the dynamic member within static members of the seal assembly when the seal assembly is separated from its normally installed position in the jet pipe.

11. An assembly as claimed in claim 1, in which a normally static member of the seal assembly is free to slide on the bulkhead member of the jet pipe assembly so that the complete seal assembly is fully floating between the said bulkhead member and the radial mating surface of a seal back member.

12. An assembly as claimed in claim 1, wherein one of said legs has a cut out portion into which part of the one backing member of the seal assembly projects, thereby limiting relative rotational movement of sealing member and the one backing member.

13. An assembly as claimed in claim 12, wherein the sealing member is substantially ring-shaped and said part of the backing member that projects into the cut out portion includes a tag depending from a substantially ring-shaped member.

14. An assembly as claimed in claim 12, wherein said part of the one backing member that projects into the cut out portion includes at least one tag that depends from at least one respective curved portion arranged around the circumference of the sealing member.

15. A jet pipe assembly as claimed in claim 1, wherein the sealing member is substantially ring-shaped but includes a gap in its circumference to allow the seal assembly to expand and contract.

16. A jet pipe assembly as claimed in claim 15, further including a plate attached to the ring adjacent the gap, the plate arranged so that it substantially spans the gap during expansion of the seal assembly.

* * * * *